(12) United States Patent
Hagiwara et al.

(10) Patent No.: US 8,765,286 B2
(45) Date of Patent: Jul. 1, 2014

(54) ELECTROCHEMICAL DEVICE

(75) Inventors: Naoto Hagiwara, Tokyo (JP); Kyotaro Mano, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 27 days.

(21) Appl. No.: 13/422,782

(22) Filed: Mar. 16, 2012

(65) Prior Publication Data

US 2012/0237820 A1 Sep. 20, 2012

(30) Foreign Application Priority Data

Mar. 18, 2011 (JP) ................................. 2011-060910

(51) Int. Cl.
*H01M 2/14* (2006.01)
(52) U.S. Cl.
USPC ............ 429/129; 429/185; 429/130; 429/131
(58) Field of Classification Search
CPC .......................... H01M 2/0217; H01M 2/0207
USPC .................. 429/185, 129, 130, 131
See application file for complete search history.

(56) References Cited

U.S. PATENT DOCUMENTS

2013/0105325 A1 * 5/2013 Sparrow et al. ............... 204/627

FOREIGN PATENT DOCUMENTS

| JP | 2001-244148 | 9/2001 |
| JP | 2008-016210 | 1/2008 |
| JP | 2009-278068 A | 11/2009 |

OTHER PUBLICATIONS

Re-examination Report Appeal No. 2013-000878 of Patent Appln. No. 2012-186040, Decision dated Mar. 6, 2013 (9 pages).
Non-final Office Action mailed Sep. 24, 2012 of Japanese Application No. 2012-186040 (6 pages).

* cited by examiner

*Primary Examiner* — Jane Rhee
(74) *Attorney, Agent, or Firm* — Pillsbury Winthrop Shaw Pittman, LLP (57) ABSTRACT

An electrochemical device is disclosed. The device comprises a casing having a recess with an opening on a top face of the recess, a lid configured to block the recess of the casing so that the recess is watertight and airtight, a rechargeable and dischargeable storage element and an electrolytic solution enclosed in the recess, and a separate sheet interposed between the first and second electrode sheets, the separate sheet having a higher liquid absorption section interposed between the first and second electrode sheets, and a lower liquid absorption section continuously connected to the higher liquid absorption section, having a liquid absorption smaller than that of the higher liquid absorption section and extending outwardly with respect to the first and second electrode sheets. The lower liquid absorption section has a thickness greater than that of the higher liquid absorption section.

6 Claims, 6 Drawing Sheets

ELECTROCHEMICAL DEVICE

CROSS-REFERENCE TO RELATED APPLICATIONS

This application is based upon and claims the benefit of priority from prior Japanese Patent Application No. 2011-060910, filed Mar. 18, 2011 titled "an electrochemical device," the entire contents of which are incorporated herein by reference.

BACKGROUND

The invention relates to an electrochemical device wherein a rechargeable and dischargeable storage element is enclosed.

In electronic equipment such as cellular phones, laptops, video cameras, and digital cameras, a surface mountable electrochemical device, for example, an electric double-layer capacitor or a lithium-ion rechargeable battery is used as a power supply suitable for memory backup, for example.

This type of electrochemical device generally includes an insulating casing having a recess section with an opening on its top face, a conductive lid blocking the recess section of the casing so that the recess section is airtight and watertight, a rechargeable and dischargeable storage element and an electrolytic solution enclosed in the recess section, a positive terminal and a negative terminal provided on a mounting face of the casing, a positive wire for electrically connecting the positive terminal and the positive side of the storage element, and a negative wire for electrically connecting the negative terminal and the negative side of the storage element (See Japanese Patent Application publication No. 2009-278068.).

The storage element disclosed in Japanese Patent Application publication No. 2009-278068 is formed by accumulating a first electrode sheet consisting of an active material and having a predetermined size, a second electrode sheet consisting of an active material and having a predetermined size, and a separate sheet consisting of an ion permeation sheet and having a predetermined size in that order. Because the external form of the separate sheet is slightly larger than that of each of the electrode sheets, the outer circumference portion of the separate sheet slightly extends outwardly with respect to the electrode sheets. The material of the first electrode sheet may be either different from or the same as that of the second electrode sheet depending on what kind of the electrochemical device is used.

The separate sheet may also be used to prevent the first and second electrode sheets from shorting one another. Moreover, the separate sheet may maintain an electrolytic solution between the first and second electrode sheets and allow an ion to move in the maintained electrolytic solution. The separate sheet may be made of fibrous porous sheets having a suitable thickness.

In the electrochemical device, the first and second electrode sheets as well as the separate sheet are impregnated with the electrolytic solution. The electrolytic solution flows slightly during recharge and discharge processes. However, the electrolytic solution contained in the electrode sheets may be electrolyzed or deteriorated during recharge and discharge processes, which causes the electrolytic solution contained in the portion of the separate sheet interposed between the electrode sheets to be drawn into the electrode sheets, thereby decreasing the amount of the electrolytic solution existing in the portion of the separate sheet between the electrode sheets even though it is extremely small amount.

If such decrease in the amount of the electrolytic solution occurs, it is advantageous that the portion of the separate sheet interposed between the electrode sheets draw a corresponding amount of an electrolytic solution from the portion of the separate sheet extending outwardly with respect to the electrode sheets. However, given that the thickness of the portion extending outwardly with respect to the electrode sheets is the same as that of the portion interposed between the electrode sheets and the liquid absorption of the portion extending outwardly is the same as that of the portion interposed between the electrode sheets, it is difficult to immediately draw the electrolytic solution from the portion extending outwardly to the portion interposed between the electrode sheets. In addition, the portion extending outwardly is impregnated with extremely small amount of electrolytic solution Therefore, the above decrease in the amount of the electrolytic solution contained in the portion of the separate sheet interposed between the electrode sheets during the recharge and discharge often occurs, the amount of the electrolytic solution contained in the portion remains short, which can cause deterioration in the recharge and discharge properties.

The term "liquid absorption" as used herein, refers to a water absorbing rate by the Byreck Method defined in JIS-L-1907. As the unit of the "liquid absorption", mm/10 min will be used herein.

SUMMARY

According to embodiments of the present invention, there is provided an electrochemical device capable of quickly and accurately addressing a phenomenon wherein the amount of an electrolytic solution in the portion interposed between electrode sheets decreases.

An electrochemical device according to an embodiment of the invention comprises a casing having a recess with an opening on a top face of the recess; a lid configured to block the recess of the casing so that the recess is watertight and airtight; a rechargeable and dischargeable storage element and an electrolytic solution enclosed in the recess; and a separate sheet interposed between the first and second electrode sheets, the separate sheet having a higher liquid absorption section interposed between the first and second electrode sheets, and a lower liquid absorption section continuously connected to the higher liquid absorption section, having a liquid absorption smaller than that of the higher liquid absorption section and extending outwardly with respect to the first and second electrode sheets, wherein the lower liquid absorption section has a thickness greater than that of the higher liquid absorption section.

The following detailed description and appended drawings describe and illustrate various embodiments of the invention.

DETAILED DESCRIPTION OF EXEMPLARY EMBODIMENTS

Various embodiments will be described with reference to accompanying drawings. In the description that follows, like components have been given the same or similar reference numerals, regardless of whether they are shown in different embodiments. To illustrate embodiments of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

First Embodiment

FIGS. 1 to 5 show an electrochemical device according to a first embodiment of the invention. The electrochemical device 10 shown in FIGS. 1 and 2 includes an insulating casing 11, a conductive lid 12, a storage element 13, a positive terminal 14, a negative terminal 15, a positive wire 16, a negative wire 17. The casing 11 is provided with the positive terminal 14, the negative terminal 15, the positive wire 16, and the negative wire 17, and is also provided with a connecting ring 18 and an electric collecting layer 19.

<The Configuration of the Casing>

Figure 1:
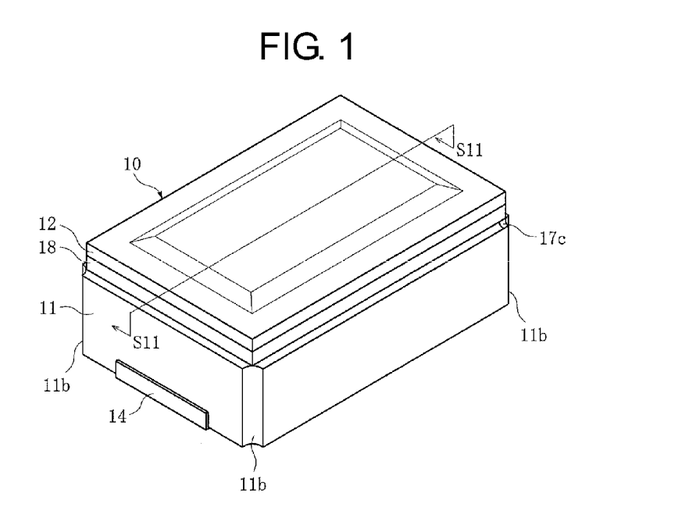
FIG. 1 is a perspective view of an electrochemical device according to a first embodiment of the invention.
Figure 2:
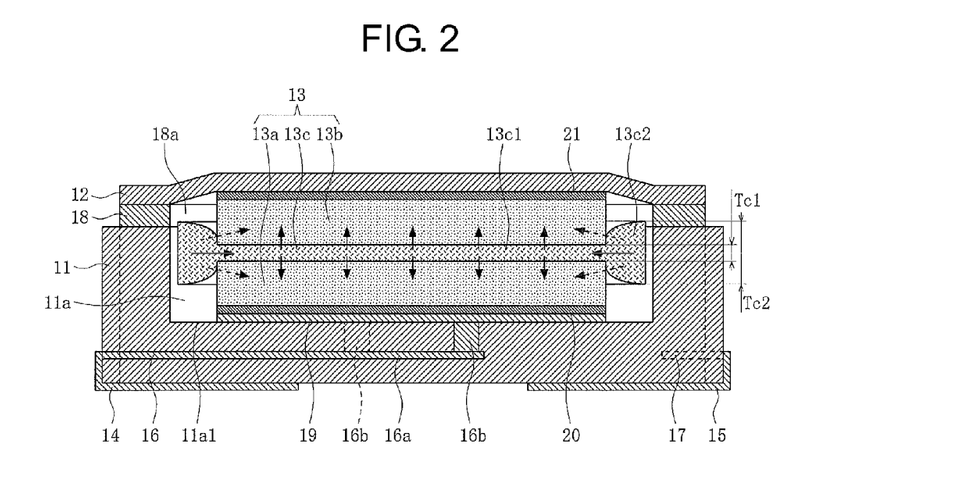
FIG. 2 is an enlarged cross-sectional view of the electrochemical device of FIG. 1 taken along S11-S11 line.

The casing 11 may be made of an insulating material such as alumina, and is formed to be a rectangular parallelepiped having a predetermined length, width, and height. On the top face of the casing 11, there is provided a recess section 11a having an opening on its top face, having an outline seen as a rectangular when viewed from above, and having a predetermined depth. The casing 11 is used so that its bottom face is used as a mounting face. On each of the four corners of the casing 11, a notch is formed to extend vertically, which has an outline seen as approximately ¼ circle when viewed above. The casing 11 is provided with the positive terminal 14, negative terminal 15, positive wire 16, and negative wire 17, and is also provided with the connecting ring 18 and layer 19.

The positive terminal 14 may be made of a conductive material such as gold, and may be formed to have an "L" letter-shape cross section extending from the center of one side face of the casing 11 which crosses a longer direction of the casing 11 to the bottom face of the casing 11 and have a predetermined width. The negative terminal 15 may be made of a conductive material such as gold, and can be formed to have an "L" letter-shape cross section extending from the center of other side face of the casing 11 which crosses the longer direction to the bottom face of the casing 11 and to have the same width as the positive terminal 14.

There might be a case wherein when the positive terminal 14 and negative terminal 15 are formed directly on the side faces and bottom face of the casing 11, they do not sufficiently stick to the faces due to the material of the casing 11. In this case, although the figures do not illustrate, a subsidiary stick layers (for example, a tungsten layer formed on the casing and a nickel layer formed on the tungsten layer) may be formed beforehand on the side faces and bottom face of the casing 11 to enable these terminals to stick to the faces more strongly.

Figure 3:
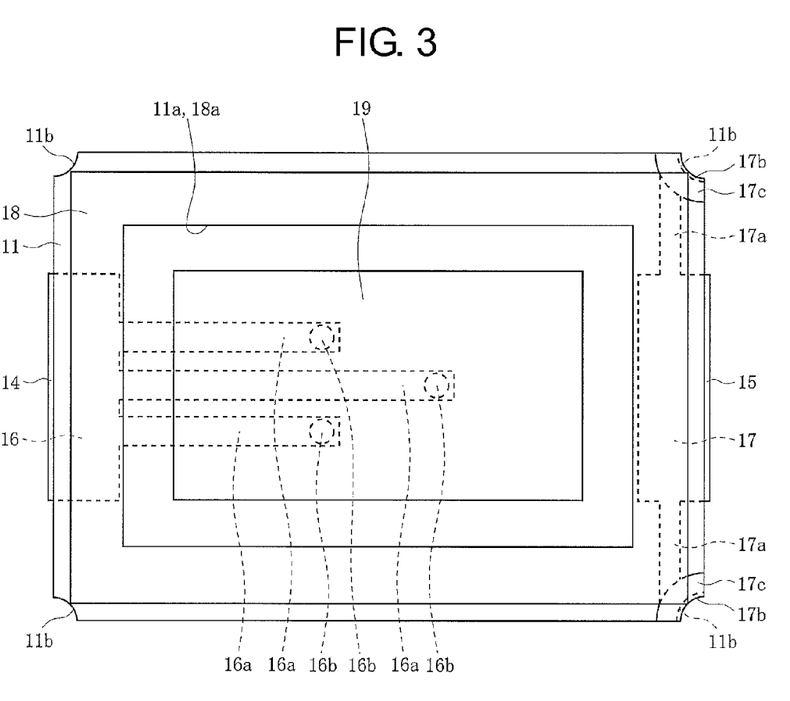
FIG. 3 is an enlarged top view of the casing of FIG. 1.

The positive wire 16 may be made of a conductive material such as tungsten, and be formed inside the casing 11 to extend the center of one side face of the casing 11 which crosses the longer direction of the casing 11 to below the layer 19. Specifically, as shown in FIG. 3, the positive wire 16 has a portion (having no reference number) having substantially the same width as the positive terminal 14, three band-shape portions 16a extending inwardly from the portion, and three column-shape portions 16b, each of which extends from the edge of the corresponding one of the portions 16a to the layer 19. The position of each of the portions 16b on the bottom face of the recess section 11a of the casing 11 is different from one another and the top face of each of the portions 16b are exposed on the bottom face of the recess section 11a. Also, the portion of the positive wire 16 which is exposed from the one side face of the casing 11 is electrically connected to the side face of the positive terminal 14.

The negative wire 17 may be made of a conductive material such as tungsten. One portion of the wire 17 is formed inside the casing 11 and other portion of the wire 17 is formed on the side face and top face of the casing 11 so that the wire 17 extends from the center of the other side face of the casing to the top face of the casing 11. Specifically, as shown in FIG. 3, the negative wire 17 has a portion (having no reference number) positioned inside the casing 11 having substantially the same width as the negative terminal 15, two band-shape portions 17a positioned inside the casing 11 extending outwardly from the portion, two band-shape portions 17b, each of which is connected continuously to the corresponding one of the portions 17a and is on the inner face of the corresponding one of the two notches of the casing 11, and two fan-shape portions 17c, each of which is connected continuously to the corresponding one of the portions 17b and is on the top face of the casing 11. Also, the portion of the negative wire 17 which is exposed from the other side face of the casing 11 is electrically connected to the side face of the negative terminal 15. Each portion 17c of the negative wire 17 positioned on the top face of the casing 11 is electrically connected to the bottom face of the connecting ring 18.

The connecting ring 18 may be made of a conductive material such as Kovar (iron-nickel-cobalt alloy), and be formed to have an outline seen as a rectangular slightly smaller than that of casing 11 when viewed from above. Also, the outline of the inner hole 18a of the connecting ring 18 when viewed from above substantially match with the outline of the recess section 11a of the casing 11. Because this connecting ring 18 is connected to the top face of the casing 11 through an adhesive material so that the inner hole 18a matches with the recess section 11a, the inner hole 18a forms a substantial recess section in conjunction with the recess section 11a.

There might be a case wherein when the connecting ring 18 is connected directly on the top face of the casing 11 by using an adhesive material, for example, a brazing material such as gold-copper alloy, they do not sufficiently stick to each other due to the material of the casing 11. In this case, although the figures do not illustrate, a subsidiary connecting layer (for example, a tungsten layer formed on the top face of the casing 11 and a nickel layer formed on the tungsten layer) may be formed beforehand on the top face of the casing 11. Also, if the connecting ring 18 is made of a material having a low corrosion resistance to an electrolytic solution, a corrosion resistance layer (for example, a nickel layer formed on the surface of the ring 18 and a gold layer formed on the nickel layer, or a nickel layer formed on the surface of the ring 18 and another layer of platinum, silver, or palladium formed on the nickel layer) may be formed on the surface of the connecting ring 18 (at least the top and bottom faces of the ring 18 and the inner face of the inner hole 18*a*) to enhance the corrosion resistance of the ring 18 to the electrolytic solution.

The electric collecting layer 19 may be made of a conductive material such as aluminum, and be formed to have an outline slightly smaller than that of the bottom face of the recess section 11*a* of the casing 11 when viewed from above to be formed on the bottom face of the recess section 11*a*. Also, the layer 19 formed on the bottom face of the recess section 11*a* of the casing 11 is electrically connected to the exposed portion of each column-shape portion 16*b* of the positive wire 16.

There might be a case wherein when the layer 19 is formed on the bottom face of the recess section 11*a* of the casing 11, there is no sufficient electric conductivity between the layer 19 and each column-shape portion due to the material of each column-shape portion, for example. In this case, a subsidiary conductive layer (for example, a nickel layer formed on the exposed portion and a gold layer formed on the nickel layer) may be formed beforehand on the surface of the exposed portion of each column-shape portion 16*b* to enhance the electric conductivity between the exposed portion of each column-shape portion and the layer 19.

<The Configuration of the Lid and How to Connect the Lid to the Casing 11>

The lid 12 may be made of a conductive material such as Kovar (iron-nickel-cobalt alloy) and be preferably made of a clad member wherein a nickel layer is formed on the top and bottom faces of a Kovar base member, or a clad member wherein a nickel layer is formed on the bottom face of Kovar member. Alternatively, the nickel layer of these clad members can be replaced with another layer of platinum, silver, or palladium. The lid 12 is formed to have an outline which substantially matches with that of the connecting ring 18 when viewed from above. Although figures illustrate that the lid 12 has a shape wherein its center portion rises, the lid 12 may have a planar shape.

This lid 12 is connected to the casing 11 by disposing the storage element 13 inside the recess section 11*a* of the casing 11 (including the inner hole 18*a* of connecting ring 18) and then connecting the outer circumference of the bottom face of the lid 12 to the top face of the connecting ring 18 to be conductive to the top face. Thus, each recess section 11*a* of the casing 11(including the inner hole 18*a* of the connecting ring 18) is blocked to be airtight and watertight. When connecting the lid 12 to the connecting ring 18, direct connecting methods such as seam welding and laser welding as well as an indirect connecting method using a conductive adhesive material may be used.

<The Configuration of the Storage Element and How to Arrange the Storage Element>

The storage element 13 includes a rectangular first electrode sheet 13*a*, a rectangular second electrode sheet 13*b*, and a rectangular separate sheet 13*c* interposed between these electrode sheets. Each of the first and second electrode sheet 13*a*, 13*b* has an outline smaller than that of the recess section 11*a* of the casing 11 when viewed from above and the separate sheet 13*c* has an outline slightly larger than that of each of the sheets 13*a*, 13*b* when viewed from above and slightly smaller than that of the recess section 11*a* of the casing 11.

The first and second electrode sheet 13*a*, 13*b* may be made of an active material such as activated carbon and PAS (Polyacenic Semiconductor) and the separate sheet 13*c* may be made of fibrous porous sheets containing mainly glass fiber, cellulose fiber, or plastic fiber, etc. The material of the first electrode sheet 13*a* may be either different from or the same as that of the second electrode sheet 13*b* depending on what kind of the electrochemical device 10 is used.

The separate sheet 13*c* includes a higher liquid absorption section 13*c*1 interposed between the electrode sheets 13*a*, 13*b*, and a lower liquid absorption section 13*c*2 continuously connected to the section 13*c*1 having lower liquid absorption and extending outwardly with respect to the electrode sheets 13*a*, 13*b*. Also, the lower liquid absorption section 13*c*2 has a thickness (maximum thickness) $Tc2$ greater than the thickness $Tc1$ of the higher liquid absorption section 13*c*1. Preferably, the thickness ratio $Tc1/Tc2$ may be in a range of 0.3-0.8. As will be described below, the higher liquid absorption section 13*c*1 may be formed from the squashed center portion of the separate sheet base member RM13*c* shown in FIG. 4, the lower liquid absorption section 13*c*2 may be formed from the no squashed outer circumference portion of the separate sheet base member RM13*c*. Further, the region of the surface of the lower liquid absorption section 13*c*2 which is near the sheets 13*a*, 13*b*, in other words, at least one portion of the surface of the lower liquid absorption section 13*c*2 contacts the outer faces of the sheets 13*a*, 13*b*.

This storage element 13 along with an electrolytic solution (which is not shown in the figures) is enclosed inside the recess section 11*a* (including the inner hole 18*a* of the connecting ring 18) blocked by the lid 12. As the electrolytic solution, a known electrolytic solution, that is, (i) a solution wherein an electrolyte sulfate dissolves in a solvent, and (ii) an ionic liquid including no solvent can be used. An example of the former (i) includes a solution wherein a solvent is chain sulfone, cyclic sulfone, chain carbonate, cyclic carbonate, chain ester, cyclic ester, or nitrile, etc., which includes cation such as lithium ion, quaternary ammonium ion, or imidazolium ion, etc., and anion such as $BF4$, $PF6$, or TFSA, etc. Also, an example of the latter (ii) includes an ionic liquid which includes cation such as imidazolium ion, pyridinium ion, or quaternary ammonium ion, etc. and anion such as $BF4$, $PF6$, or TFSA, etc.

As shown in FIG. 2, the bottom face of the first electrode sheet 13*a* of the storage element 13 is electrically connected to the top face of the layer 19 via a conductive adhesive layer 20 and the top face of the second electrode sheet 13*b* is connected to the bottom face of the lid 12 via a conductive adhesive layer 21 These conductive adhesive layers 20, 21 may be formed by curing a conductive adhesive. As the conductive adhesive, a thermosetting adhesive including conductive particles, for example, an epoxy system adhesive including graphite particles, etc. may be preferably used.

Figure 4:
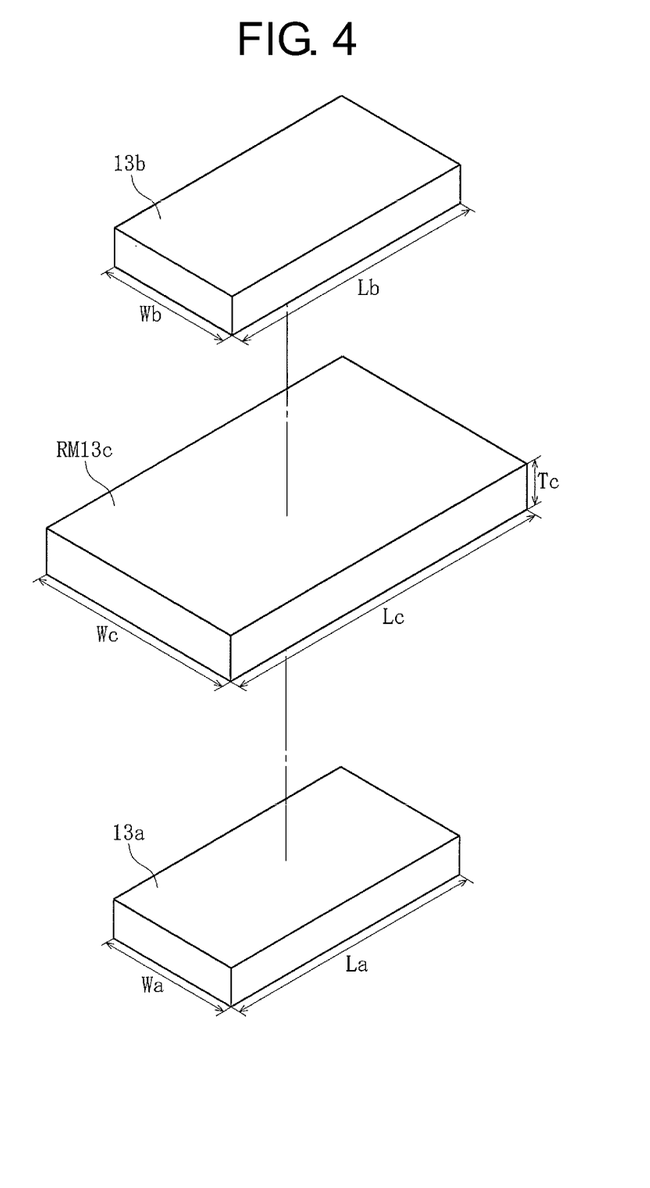
FIG. 4 is a perspective view of the storage element of FIG. 2 before arranged.

Now, how to arrange the storage element 13 will be described along with the configuration of the storage element 13 before it is arranged. FIG. 4 shows the configuration of the storage element 13 before it is arranged. In FIG. 4, the reference numbers 13*a*, 13*b*, and RM13*c* identify the first electrode sheet, the second electrode sheet, and the separate sheet base member, respectively.

The first electrode sheet 13*a* has a predetermined length La and width Wa and the second electrode sheet 13*b* has substantially the same length Lb and width Wb as the first electrode sheet 13*a*. The first and second electrode sheet 13*a*, 13*b* may be made of the materials described above. The thickness of the sheet 13*a* may be either different from or the same as that of the sheet 13*b* depending on what kind of the electrochemical device 10 is used.

The separate sheet base member RM13*c* has a predetermined length Lc, width Wc, and thickness Lc and a predetermined porosity and liquid absorption (average value). Also, the base member RM13*c* has a hardness (softness) capable of being squashed by the sheets 13*a*, 13*b* The length Lc of the separate sheet base member RM13*c* is preferably 20-40% longer than lengths (La, Lb) of the sheet 13*a*, 13*b* and the width Wc of the base member RM13c is preferably greater than the widths (Wa, Wb) of the sheets 13a, 13b. Further, the material of the separate sheet base member RM13c is the same as that of the separate sheet sheet 13c.

Figure 5:
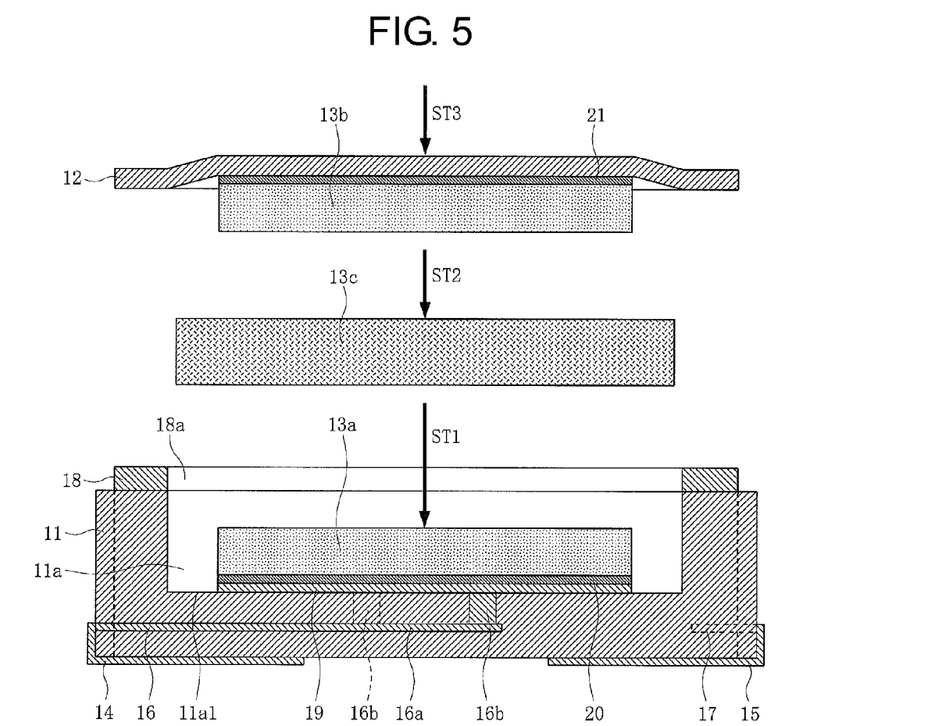
FIG. 5 is a view illustrating how to arrange the first electrode sheet, second electrode sheet, and separate sheet base member of FIG. 4 (how to arrange the storage element)

When the storage element 13 is arranged, firstly, an uncured conductive adhesive is applied to the surface of the layer 19 as shown in FIG. 5, and the bottom face of the first electrode sheet 13a is pressed against and stuck to the conductive adhesive, and the conductive adhesive is cured, and then an electrolytic solution is poured into the first electrode sheet 13a so that the first electrode sheet 13a is impregnated with the solution (step (which may be referred to as "ST") 1). Then, the separate sheet base member RM13c is mounted on the top face of the first electrode sheet 13a and an electrolytic solution is poured into the separate sheet base member RM13c so that the base member RM13c is impregnated with the solution (ST2). Before or after such steps, the same uncured conductive adhesive is applied to the bottom face of the lid 12, and the top face of the second electrode sheet 13b is pressed against and stuck to the conductive adhesive, and the conductive adhesive is cured, and then an electrolytic solution is poured into the second electrode sheet 13b so that the second electrode sheet 13b is impregnated with the solution. Then, while the outer circumference portion of the bottom face of the lid 12 is overlapped over the top face of the connecting ring 18, the bottom face of the second electrode sheet 13b is pressed against the top face of the separate sheet 13c (ST3). Then, the lid 12 is connected to the connecting ring 18.

Additionally, if the polarities of the first and second electrode sheet 13b forming the storage element 13 are determined beforehand, when the storage element 13 is disposed inside each recess section 11a of the casing 11 (including the inner hole 18a of the connecting ring 18), which one of the first and second electrode sheet 13a, 13b should be disposed first should be noted. For example, if the polarities of the first and second electrode sheet 13a, 13b are determined beforehand to be positive and negative, respectively, the first electrode sheet 13a which is determined to be positive may be disposed to face the top face of the layer 19 and the second electrode sheet 13b which is determined to be negative may be disposed to face the bottom face of the lid 12.

In the ST3, the center portion of the separate sheet base member RM13c is squashed by the top face of the first electrode sheet 13a and the bottom face of the second electrode sheet 13b and the squashed portion of the base member RM13c becomes the higher liquid absorption section 13c1 having the thickness of Tc1 (See FIG. 2.). The outer circumference portion of the separate sheet base member RM13c is not squashed and therefore become the lower liquid absorption section 13c2 having the thickness (maximum thickness) of Tc2 (See FIG. 2.). The thickness (maximum thickness) Tc2 is the same as the thickness Tc of the separate sheet base member RM13c.

<The Porosity and Liquid Absorption of the Separate Sheet>

The porosity and liquid absorption of each of the higher liquid absorption section 13c1 and lower liquid absorption section 13c2 will be described specifically.

In an experiment, a separate sheet base member RM13c was prepared to have a porosity of 85% and a liquid absorption (average value) to an electrolytic solution (a solution wherein an solvent is cyclic sulfolan and cation is TEMA and anion is BF4 is used) of 10 mm/10 min. With this base member, the separate sheet 13c was obtained to have a thickness ratio Tc1/Tc2 of 0.5, which means the rate of the thickness Tc1 of the higher liquid absorption section 13c1 to the thickness (maximum thickness) of the lower liquid absorption section 13c2. The experiment showed that the porosity of the higher liquid absorption section 13c1 was approximately 70%, that the porosity of the lower liquid absorption section 13c2 was approximately 84%, that the liquid absorption (average value) of the higher liquid absorption section 13c1 was 16 mm/10 min, and that the liquid absorption (average value) of the lower liquid absorption section 13c2 was 10.5 mm/10 min.

In this case, the porosity (70%) of the higher liquid absorption section 13c1 formed by being squashed did not significantly decrease with respect to the porosity (85%) of the separate sheet base member RM13c and the porosity (84%) of the lower liquid absorption section 13c2. The reason why is that the separate sheet base member RM13c used had a high porosity. According to another experiment, when another separate sheet base member RM13c having a porosity of 85-95% was used and a thickness ratio Tc1/Tc2 was 0.5, it was proved that the higher liquid absorption section 13c1 could have a porosity of 70-90%. Additionally, when another separate sheet base member RM13c having a porosity of 85-95% was used and a thickness ratio Tc1/Tc2 was 0.3-0.8, it was also proved that the porosity of the higher liquid absorption section 13c1 did not significantly decrease with respect to that of the separate sheet base member RM13c and that of the lower liquid absorption section 13c2.

The liquid absorption (average value: 16 mm/10 min) of the higher liquid absorption section 13c1 formed by being squashed significantly increased with respect to the liquid absorption (10 mm/10 min) of the separate sheet base member RM13c and the liquid absorption (average value: 10.5 mm/10 min) of the lower liquid absorption section 13c2. The reason why is that the shape of the cross section of each aperture included in the separate sheet base member RM13c was squashed to be smaller. In another experiment, a separate sheet base member RM13c was prepared to have a porosity of 85-95% and a liquid absorption (average value) to an electrolytic solution of 5-30 mm/10 min. With this base member, the separate sheet 13c was obtained to have a thickness ratio Tc1/Tc2 of 0.5. The experiment showed that the liquid absorption of the higher liquid absorption section 13c1 could have a liquid absorption of 7-51 mm/min. In addition, when a separate sheet base member RM13c having a porosity of 85-95% was used, and the thickness ratio Tc1/Tc2 of the separate sheet 13c was in a range of 0.3-0.8, it was proved that the liquid absorption of the higher liquid absorption section 13c1 significantly increased with respect to that of the separate sheet base member RM13c and that of the lower liquid absorption section 13c2.

<The Technical Advantages Obtained by the Electrochemical Device (According to the First Embodiment)>

In the electrochemical device 10, the first and second electrode sheet 13a, 13b and separate sheet 13c are mainly impregnated with the electrolytic solution. Since the separate sheet 13c extends outwardly with respect to the sheets 13a, 13b and has the lower liquid absorption section 13c2 whose thickness is greater than the thickness of the higher liquid absorption section 13c1, the lower liquid absorption section 13c2 is impregnated with adequate amount of the electrolytic solution.

The electrolytic solution with which the first and second electrode sheet 13a, 13b as well as separate sheet 13c are impregnated slightly flow during recharge and discharge processes. However, the electrolytic solution contained in the sheets 13a, 13b may be electrolyzed or deteriorated during the processes, which causes the electrolytic solution included in the portion (higher liquid absorption section 13c1) of the separate sheet 13c interposed between the sheets 13a, 13b to be drawn into the sheets 13a, 13b, thereby decreasing the amount of the electrolytic solution existing in the portion even though it is extremely small amount (See arrows extending vertically in FIG. 2.).

Even if such decrease in the amount of the electrolytic solution during the processes occurs, according to the electrochemical device 10, the electrolytic solution with which the lower liquid absorption section 13c2 is impregnated may be immediately drawn into the higher liquid absorption section 13c1 due to the difference in liquid absorption between the sections 13c1, 13c2 so that the electrolytic solution may be immediately supplied to the higher liquid absorption section 13c1 (See arrows extending horizontally in FIG. 2). Also, because the lower liquid absorption section 13c2 is impregnated with adequate amount of the electrolytic solution, even if the decrease in the amount of the electrolytic solution during the processes often occurs, the electrolytic solution may be immediately supplied to the higher liquid absorption section 13c1. In other words, even if a phenomenon wherein the amount of the electrolytic solution contained in the portion (higher liquid absorption section 13c1) interposed between the sheet 13a, 13b decreases often occurs, the phenomenon can be surely and quickly addressed, thereby avoiding deterioration in the recharge and discharge properties due to such a phenomenon.

Also, at least one portion of the surface of the lower liquid absorption section 13c2 contacts the outer side faces of the sheets 13a, 13b. Thus, if the electrolytic solution included in the sheets 13a, 13b electrolyzed or deteriorated, then the sheets 13a, 13b can be supplied with the electrolytic solution directly from the lower liquid absorption section 13c2, not from the higher liquid absorption section 13c1 (See dotted arrows shown in FIG. 2). In other words, the phenomenon wherein the electrolytic solution included in the higher liquid absorption section 13c1 is drawn into the sheets 13a, 13b and the amount of the electrolytic solution in the section 13c1 therefore decreases, may be avoided by the action wherein the electrolytic solution is supplied to the sheets 13a, 13b from the lower liquid absorption section 13c2.

Second Embodiment

Figure 6:
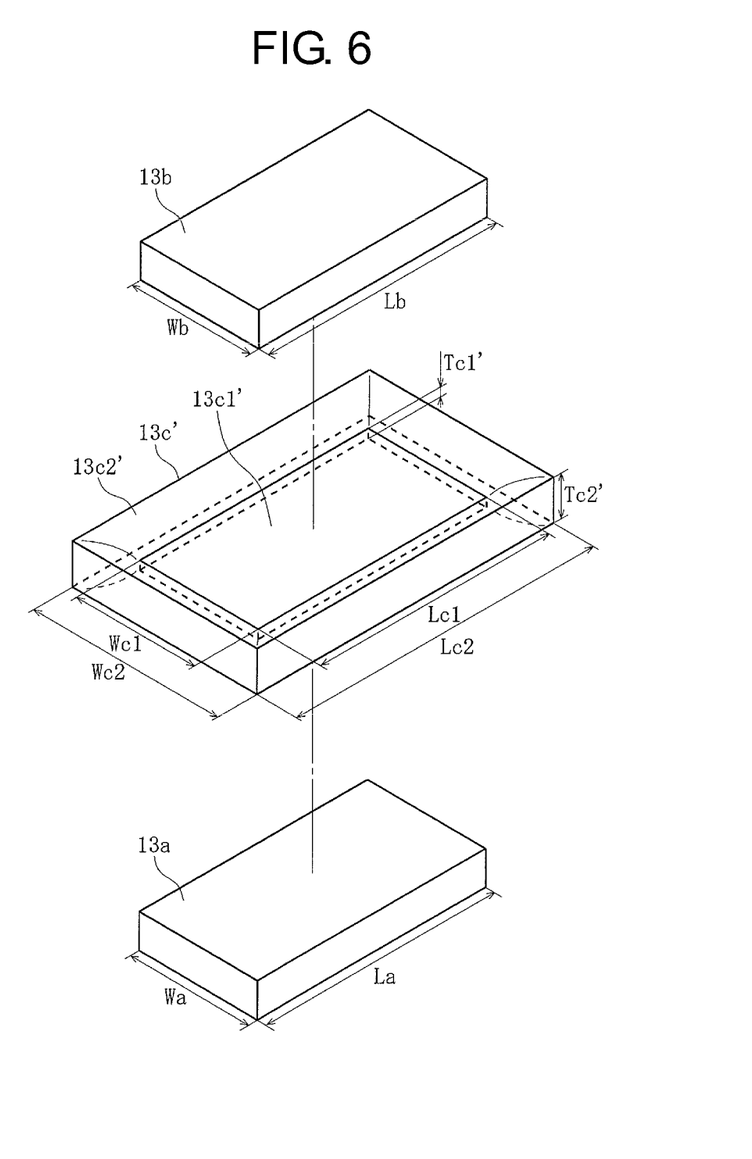
FIG. 6 is a perspective view of a storage element (before arranged) of an electrochemical device according to a second embodiment of the invention.
Figure 7:
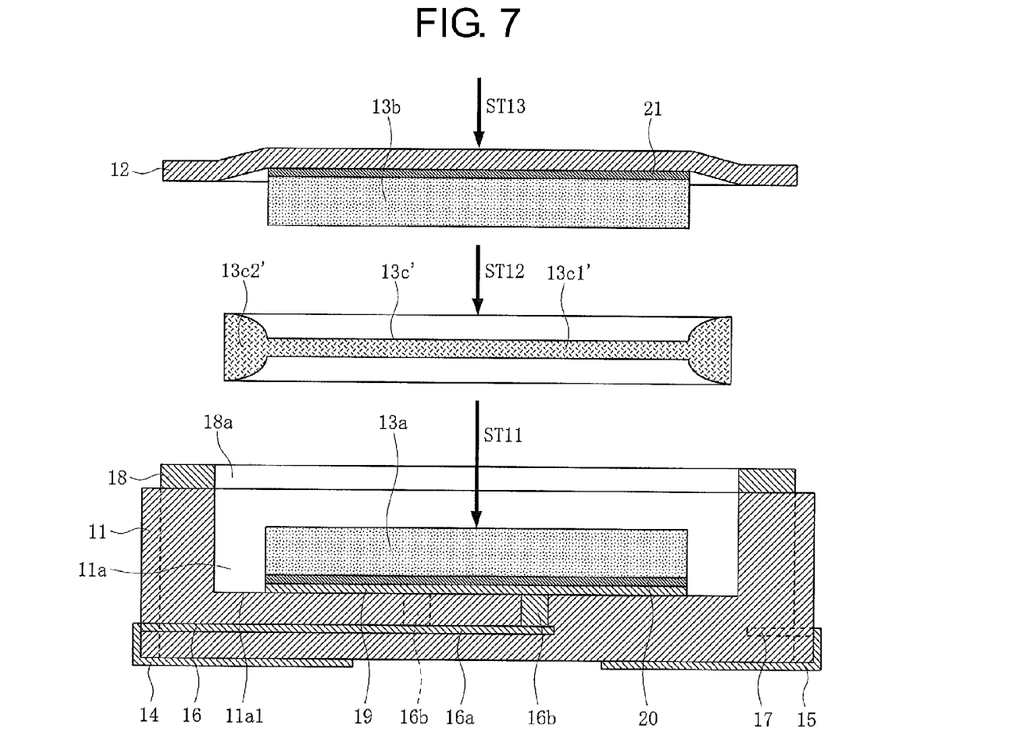
FIG. 7 is a view illustrating how to arrange the first electrode sheet, second electrode sheet, and separate sheet (how to arrange the storage element).

FIGS. 6 and 7 show an electrochemical device according to a second embodiment of the invention. The electrochemical device according to the second embodiment differs from the electrochemical device 10 according to the first embodiment in that the device according to the second embodiment uses a separate sheet 13c' of the storage element 13 wherein a higher liquid absorption section 13c1' and a lower liquid absorption section 13c2' are formed beforehand. Other configuration of the device according to the second embodiment is the same as that of the first embodiment and its description will be omitted.

In the separate sheet 13c' shown in FIG. 6, the higher liquid absorption section 13c1' and lower liquid absorption section 13c2' are formed beforehand by pressing the separate sheet base member RM13c shown in FIG. 4. Specifically, a top mold having the same shape as the top face of the first electrode sheet 13a and a bottom mold having the same shape as the bottom face of the second electrode sheet 13b are prepared and the center portion of the separate sheet base member RM13c are pressed and squashed by both of the top and bottom molds to form the higher liquid absorption section 13c1' having a thickness of Tc1' The outer circumference portion of the separate sheet base member RM13c which is not squashed forms the lower liquid absorption section 13c2' having a thickness (maximum thickness) of Tc2'. While the thickness Tc1' of the higher liquid absorption section 13c1' is the same as the thickness Tc1 shown in FIG. 2, the thickness Tc2' of the lower liquid absorption section 13c2' is the same as the thickness Tc2 shown in FIG. 2.

As described above, although the separate sheet base member RM13c has a hardness (softness) capable of being squashed, if the separate sheet base member RM13c has a strong elastic force, then the thickness Tc1' of the higher liquid absorption section 13c1' formed by being squashed may increase after being squashed. In this case, when the higher liquid absorption section 13c1' is pressed, it may be heated and then cooled after being squashed so that the thickness Tc1' of the higher liquid absorption section 13c1' may be maintained.

When the storage element 13 is arranged, firstly, an uncured conductive adhesive is applied to the surface of the layer 19 as shown in FIG. 7, the bottom face of the first electrode sheet 13a is pressed against and stuck to the conductive adhesive, and the conductive adhesive is cured, and then an electrolytic solution is poured into the first electrode sheet 13a so that the first electrode sheet 13a is impregnated with the solution (ST11). Then, the separate sheet 13c' is mounted on the first electrode sheet 13a so that the bottom face of the higher liquid absorption section 13c1' matches with the top face of the first electrode sheet 13a, and an electrolytic solution is poured into the separate sheet 13c' so that the electrolytic solution is impregnated with the solution (ST12). Before or after such steps, the same uncured conductive adhesive is applied to the bottom face of the lid 12, and the top face of the second electrode sheet 13b is pressed against and stuck to the conductive adhesive, and the conductive adhesive is cured, and then an electrolytic solution is poured into the second electrode sheet 13b so that the second electrode sheet 13b is impregnated with the solution. Then, while the outer circumference portion of the bottom face of the lid 12 is overlapped over the top face of the connecting ring 18, the second electrode sheet 13b is mounted on the separate sheet 13c' so that the bottom face of the second electrode sheet 13b matches with the top face of the higher liquid absorption section 13c1' (ST13). Then, the lid 12 is connected to the connecting ring 18.

Additionally, if the polarities of the first electrode sheet 13a and second electrode sheet 13b forming the storage element 13 are determined beforehand, when the storage element 13 is disposed inside each recess section 11a of the casing 11 (including the inner hole 18a of the connecting ring 18), which one of the first electrode sheet 13a and second electrode sheet 13b should be disposed first should be noted. For example, the polarities of the first electrode sheet 13a and second electrode 13b are determined to be positive and negative, respectively, the first electrode sheet 13a which is determined to be positive can be disposed to face the top face of the layer 19 and the second electrode sheet 13b which is determined to be negative can be disposed to face the bottom face of the lid 12.

The shape of the cross section of the separate sheet 13c' after the storage element 13 is arranged is the same as the shape of the cross section of the separate sheet 13c shown in FIG. 2. The porosity and liquid absorption of the separate sheet 13c' are the same as those of the separate sheet 13c shown in FIG. 2

<The technical advantages obtained by the electrochemical device (according to the second embodiment)> According to the electrochemical device, the advantages described with respect to the first embodiment can also be obtained. Moreover, the bottom face of the higher liquid absorption section 13c1' of the separate sheet 13c' has a depression, and its shape matches with the shape of the top face of the first electrode sheet 13a. Also, the top face of the higher liquid absorption section 13c1' has a depression, and its shape matches with the bottom face of the second electrode sheet 13b. Thus, when the bottom face of the higher liquid absorption section 13c1' of the separate sheet 13c' is mounted on the top face of the first electrode sheet 13a, the alignment of them can be done simply and accurately. Also, when the top face of the second electrode sheet 13b is mounted on the higher liquid absorption section 13c1' of the separate sheet 13c', the alignment of them can be done simply and accurately.

The embodiments of the invention can be widely applied to various electrochemical devices with a rechargeable and dischargeable storage element, for example, a lithium ion capacitor, redox capacitor, and lithium ion battery, etc.

All documents mentioned herein, including in the Background section or otherwise, are incorporated by reference in their entirety.

What is claimed is:

1. An electrochemical device comprising:
   a casing having a recess with an opening;
   a lid connected to an open side of the casing so as to form an enclosed portion between the lid and the recess; and
   a rechargeable and dischargeable storage element enclosed in the enclosed portion, the storage element including a first electrode sheet, a second electrode sheet, and a porous separate sheet capable of maintaining an electrolytic solution, the separate sheet being interposed between the first and second electrode sheets,
   wherein the separate sheet includes:
   a first section interposed between the first and second electrode sheets, the first section in direct contact with the first and second electrode sheets, and having a first thickness;
   a second section having a second thickness greater than the first thickness, the second section extending outwardly with respect to the first and second electrode sheets without contacting the lid and having a porosity greater than that of the first section; and
   a third section disposed on at least a part of a surface of the second section, the third section contacting an outer surface of each of the first and second electrode sheets in such a manner as to supply the electrolytic solution to the first and second electrode sheets.

2. The electrochemical device according to claim 1, further comprising a conductive adhesive layer provided between the casing and the first electrode sheet.

3. The electrochemical device according to claim 1, further comprising a conductive adhesive layer provided between the lid and the second electrode sheet.

4. The electrochemical device according to claim 2, further comprising a conductive adhesive layer provided between the lid and the second electrode sheet.

5. The electrochemical device according to claim 2, further comprising an electric collecting layer formed in the recess of the casing and provided between the conductive adhesive layer and the first electrode sheet.

6. The electrochemical device according to claim 1, further comprising a connecting ring having a hole therein that corresponds to the opening of the casing, wherein the connecting ring is provided between the casing and the lid to form the enclosed portion.

* * * * *